United States Patent [19]

Williams et al.

[11] 4,004,715
[45] Jan. 25, 1977

[54] FLUID DISPENSING APPARATUS

[75] Inventors: Roger A. Williams, Agincourt; Robert E. Dietz, Wellesley, both of Canada

[73] Assignee: Auto Control Tap of Canada Limited, Agincourt, Canada

[22] Filed: May 5, 1975

[21] Appl. No.: 574,661

[52] U.S. Cl. .................. 222/30; 222/70; 222/153; 137/505.35
[51] Int. Cl.² .......................................... B67D 5/24
[58] Field of Search ............ 222/70, 504, 153, 30; 137/505.35, 505.38, 140.2; 251/122

[56] References Cited
UNITED STATES PATENTS

| | | | |
|---|---|---|---|
| 518,199 | 4/1894 | Sarvent | 137/505.35 |
| 583,546 | 6/1897 | Pierson | 137/505.35 |
| 3,162,340 | 12/1964 | Erickson | 222/504 X |
| 3,221,936 | 12/1965 | Spinuzza | 222/504 X |
| 3,380,629 | 4/1968 | Kontra et al. | 222/70 X |
| 3,408,036 | 10/1968 | Smith et al. | 222/70 X |
| 3,813,008 | 5/1974 | Olson | 222/70 |
| 3,823,846 | 7/1974 | Probst | 222/70 |

Primary Examiner—Allen N. Knowles
Assistant Examiner—Hadd Lane
Attorney, Agent, or Firm—Rogers, Bereskin & Parr

[57] ABSTRACT

Fluid dispensing apparatus for dispensing preselected quantities of fluid from a supply of fluid under pressure having a flow regulator and a dispenser. The flow regulator is adapted to be coupled to the fluid supply so that fluid is supplied to the dispenser at a relatively constant pressure below the fluid supply pressure. The dispenser has a valve and a solenoid actuator which is energized to open the valve to permit fluid flow through the dispenser. A timing circuit in the dispenser energizes the solenoid actuator for a predetermined interval upon energization of the timing circuit. A size selector assembly coupled to the timing circuit enables the predetermined interval and therefore the quantity of fluid dispensed to be preselected from a plurality of possible quantities. The preselected predetermined interval may be varied to change the selected size or quantity of fluid to be dispensed.

16 Claims, 8 Drawing Figures

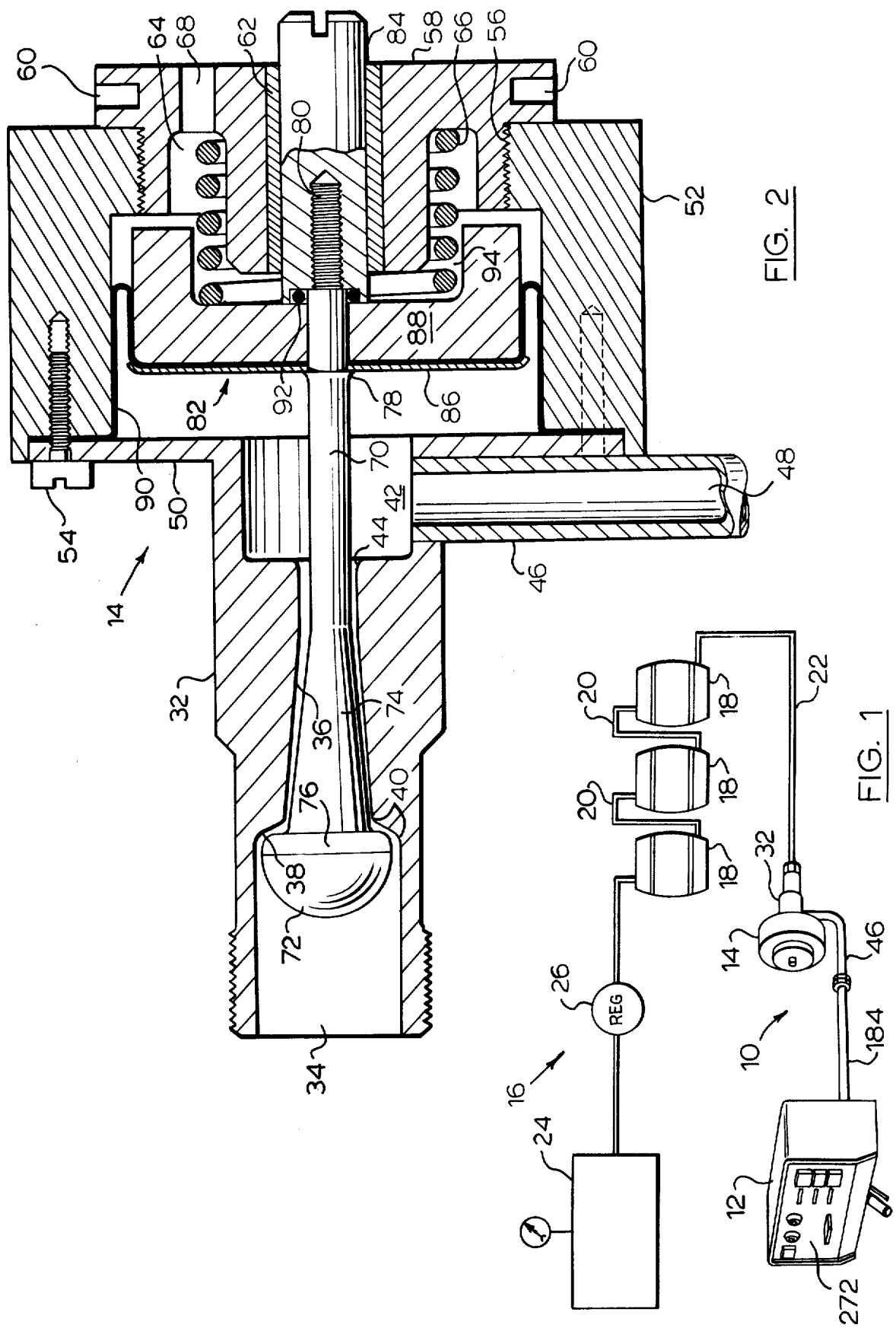

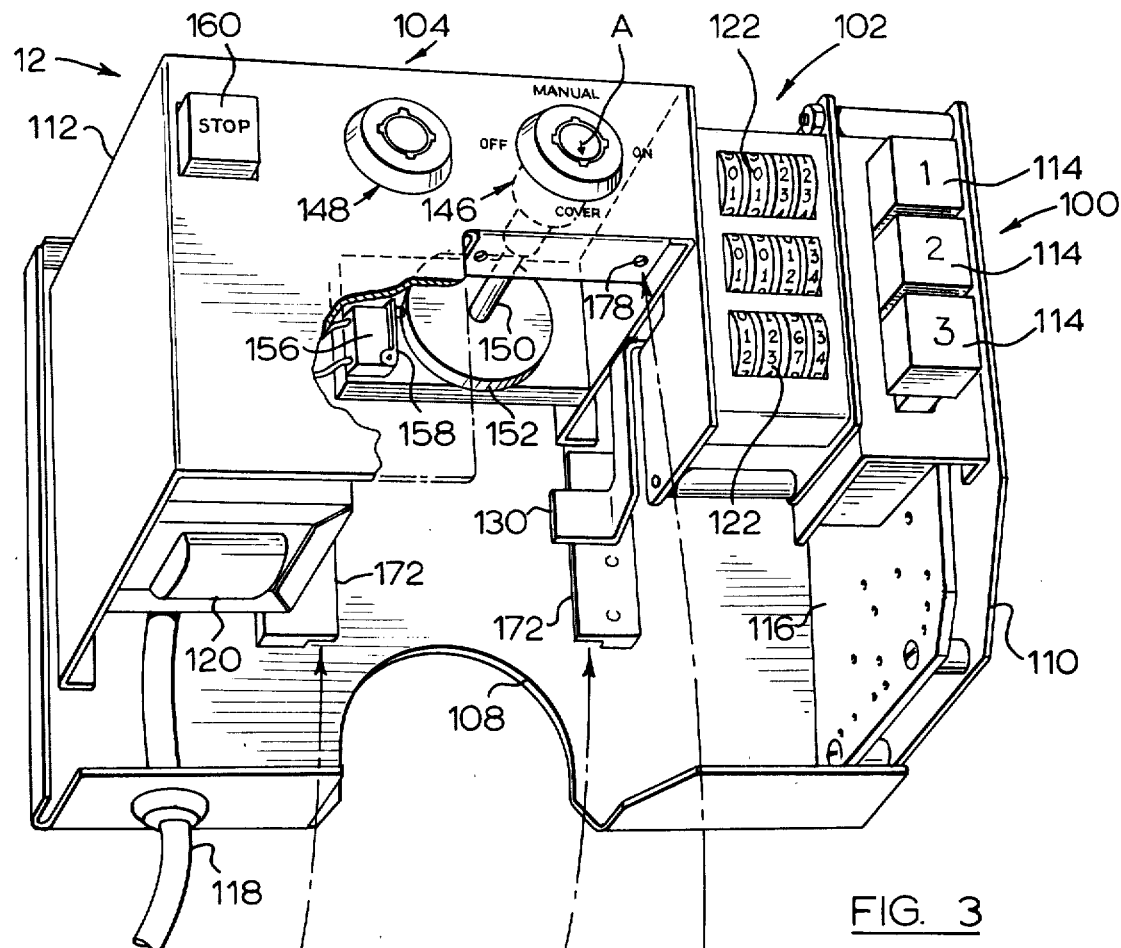
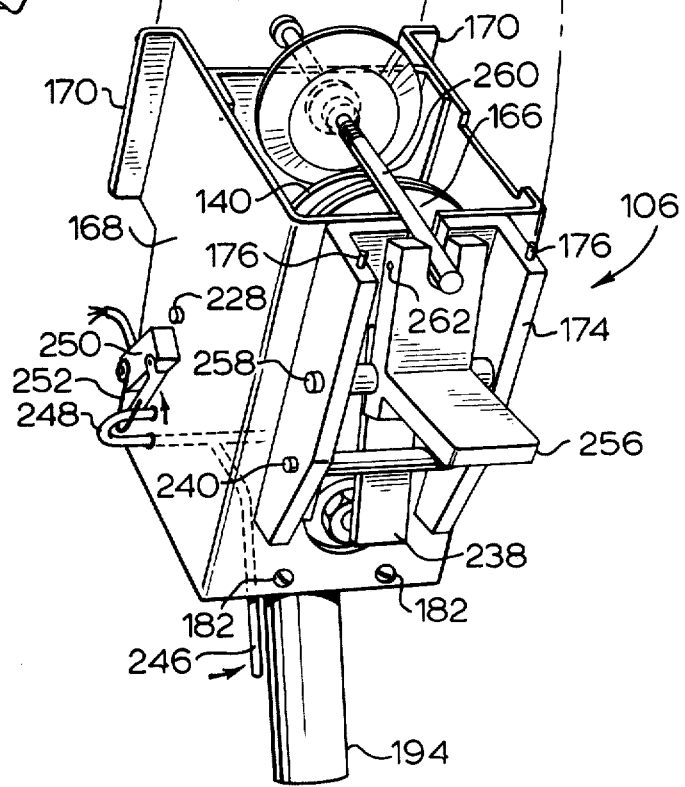
FIG. 3

FLUID DISPENSING APPARATUS

This invention relates to fluid dispensing apparatus for automatically dispensing preselected quantities of fluid from a supply of fluid under pressure.

Automatic fluid dispensing systems have been developed in the past for filling a container or the like with a desired amount of fluid. A common form of such systems is the time controlled type. The dispensing apparatus in the time controlled system has a faucet which is coupled to a source of fluid under pressure. The faucet includes a valve which is opened to permit fluid to flow through the faucet into the container. The valve is coupled to a control unit which, when activated, causes the valve to open for a predetermined interval. A timing mechanism or the like is generally used in the control unit to open the valve for the predetermined interval. The quantity of fluid dispensed is proportional to the length of time during which the valve is open.

It is desirable in the time controlled dispensing system that the dispensing apparatus be able to accurately and consistently dispense a predetermined quantity of fluid. The predetermined interval during which the valve is open upon successive fluid dispensations must be constant in order to do this. Also, the pressure of the fluid supply must be constant during successive fluid dispensations. A change in the fluid supply pressure results in a change in the fluid flow rate through the faucet. If the flow rate changes between successive openings of the faucet valve, the dispensing apparatus will not dispense consistent quantities of fluid.

The supply pressure in most fluid dispensing systems varies as the quantity and temperature of the fluid in the supply or source changes. A difficulty with the time controlled dispensing apparatus developed to date is that they do not compensate adequately for the changing supply pressure. This results in inaccurate fluid dispensations and wasted fluid.

It is common in time controlled dispensing apparatus to be able to adjust the quantity of fluid to be dispensed through the faucet. One method of doing this is to make the control unit timing mechanism adjustable so that the predetermined interval can be varied. A difficulty with this type of adjustment is that it is difficult to accurately change the output quantity without wasting fluid by dispensing trial quantities. Also, it is often difficult to make quick quantity changes.

Another method of dispensing different quantities of fluid is to use a plurality of timing mechanisms in the control unit which can be alternatively coupled to the valve. The difficulty with this type of adjustment is that the number of mechanisms may be limited by the physical dimensions of the control unit or the faucet. Also, a plurality of timing mechanisms may make the control unit undesirably large and expensive.

It is an object of the present invention to provide dispensing apparatus that is simple and compact and that is capable of dispensing a plurality of preselected quantities of fluid, each of which may be varied.

Accordingly, in one of its aspects the present invention provides a dispenser unit having a valve assembly for controlling fluid flow through the dispenser. The valve assembly includes a valve and a solenoid actuator. Energization of the solenoid actuator opens the valve to permit fluid flow through the dispenser. A timing circuit in the dispenser energizes the solenoid actuator for a predetermined interval upon energization of the timing circuit. A size selector assembly having a plurality of selector switches is coupled to the timing circuit so that the predetermined interval and therefore the quantity of fluid to be dispensed may be preselected by simply closing one of the selector switches.

It is a further object of the present invention to provide time controlled dispensing apparatus for dispensing preselected quantities of fluid in which the dispensed quantity is generally unaffected by variations in fluid supply pressure.

Accordingly, in another of its aspects the present invention provides a flow regulator and a dispenser unit substantially as described above. The flow regulator is adapted to be coupled between a supply of fluid under pressure and the dispenser so that fluid flows from the supply through the regulator to the dispenser. The regulator supplies fluid to the dispenser at a relatively constant pressure below the fluid supply pressure. Consecutive openings of the dispenser valve for a preselected predetermined interval therefore results in fluid dispensations of consistent quantity. Further objects and advantages of the invention will appear from the following description taken together with the accompanying drawings, in which:

FIG. 1 is a diagramatic view of a fluid system employing fluid dispensing apparatus according to the present invention;

FIG. 2 is a cross-sectional view of a flow regulator which is part of the apparatus shown in FIG. 1;

FIG. 3 is an exploded perspective view of a dispenser which is also part of the apparatus shown in FIG. 1;

Figure 4:
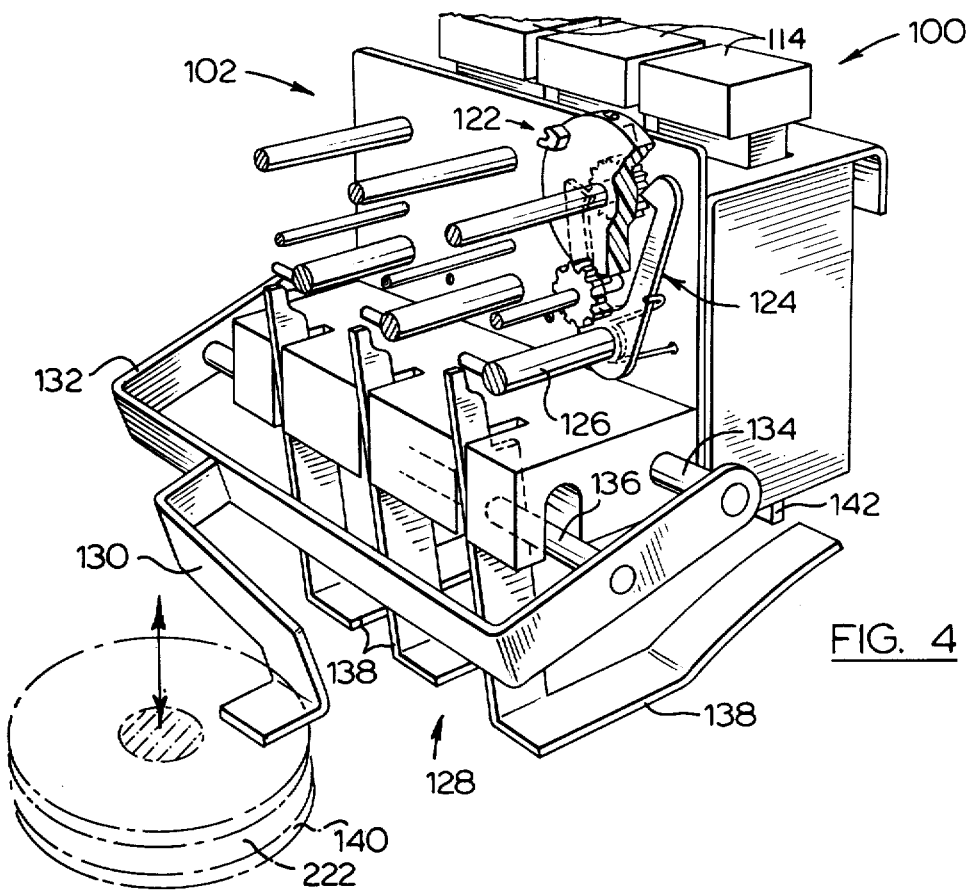
FIG. 4 is a perspective view of the size selector assembly and part of the counter assembly of the dispenser.

Referring firstly to FIG. 1, fluid dispensing apparatus according to the present invention is generally indicated by the reference numeral 10. Dispensing apparatus 10 includes a dispenser 12 and a flow regulator 14. Flow regulator 14 is shown to be connected to a typical fluid supply system which is generally indicated by reference numeral 16. Supply system 16 is of the type which is commonly used for supplying carbonated beverages, such as beer, to a conventional tap or faucet. The dispensing apparatus of the present invention may be used for dispensing any type of fluid, but it is particularly useful for dispensing beer as will be discussed below.

In a typical beer supply system 16, a plurality of beer kegs 18 (usually four to 18 kegs) are coupled together in series by beer lines 20. A beer supply line 22 is used to deliver the beer from kegs 18 to a conventional tap or faucet (not shown) which is usually a manually operated valve. Beer kegs 18 are normally stored in a basement walk-in refrigerator so that supply line 22 commonly varies in length from 40 to 80 feet. Beer kegs 18 are pressurized by an air compressor 24 or other pressure source such as pressurized carbon dioxide cylinders. The pressure supplied to beer kegs 18 is maintained sufficiently high (typically 40 to 100 lbs. per square inch) by a pressure regulator 26 to force the beer through supply line 22 so that it is delivered to the dispensing faucet at a flow rate of about 2 fluid ounces per second.

The typical beer supply system 16 is subject to substantial inherent fluid flow losses, primarily due to the distance the beer must travel before it is dispensed. The result is that the static fluid pressure at the faucet when the faucet valve is closed is substantially higher than the dynamic fluid pressure at the faucet when the faucet valve is open. When the faucet valve is initially opened or "cracked", the high static pressure causes an undesirably high initial flow rate through the valve. When the valve is fully open, the lower dynamic pressure then gives a satisfactory flow rate through the faucet valve. The situation is further complicated by the amount of beer in kegs 18. As the individual kegs are emptied or "blown", the fluid flow resistance through these kegs decreases so that the dynamic pressure at the faucet and therefore the flow rate through the faucet increases. The result is that although the air pressure supply to kegs 18 is constant, as the quantity of beer in the supply system decreases, the quantity of beer dispensed per unit time through the faucet increases. The time controlled dispensing devices developed in the past have been unsatisfactory because of this changing flow rate.

The dispensing apparatus of the present invention includes flow regulator 14 which is located adjacent to dispenser 12. Flow regulator 14 typically reduces the pressure of the fluid supply from about 12 to 50 lbs. per square inch to 1 to 5 lbs. per square inch. Because regulator 14 is located close to dispenser 12, the dynamic fluid pressure supplied to dispenser 12 is substantially the same as the static fluid pressure. The initial pressure drop as the dispenser valve is cracked is therefore substantially eliminated. This is important when carbonated fluids such as beer are being dispensed, because a high pressure drop results in the creation of excessive foam in the dispensed beer. Regulator 14 also absorbs any dynamic pressure changes as kegs 18 are emptied, so that the quantity of fluid dispensed per unit time by dispenser 12 remains generally constant as the quantity of fluid in the supply or source changes.

The dispensing apparatus of the present invention will now be described in detail by referring firstly to FIG. 2 in which flow regulator 14 is shown in cross-section. A cylindrical valve housing 32 is formed with a fluid inlet channel 34 which communicates with an axial tapered flow channel 36. An annular valve seat 38 is located between fluid inlet channel 34 and tapered flow channel 36. Rounded edges 40 are formed inside the valve housing 32 adjacent to annular valve seat 38 to provide a relatively smooth fluid flow path from inlet channel 34 to tapered flow channel 36. Valve housing 32 is also formed with an axial expansion chamber 42 which communicates with tapered flow channel 36. Rounded edges 44 again provide a relatively smooth fluid flow passage from tapered flow channel 36 to expansion chamber 42. A fluid outlet conduit 46 is attached to valve housing 32 to provide a fluid output passage 48 which communicates with expansion chamber 42. Valve housing 32 is also formed with an annular flange 50, and a cylindrical diaphragm housing 52 is attached thereto by screws 54.

Diaphragm housing 52 is formed with a threaded axial opening 56 and a threaded plug member 58 is screwed into opening 56. Radial openings 60 are formed in plug member 58 to accommodate a tool which is used to screw plug member 58 into diaphragm housing 52. Plug member 58 is formed with an axial bore and a bushing 62 is inserted therein. An annular recess 64 is formed in plug member 58 to accommodate a coil spring 66. A vent hole 68 is also formed in plug member 58 to permit movement of the internal parts of flow regulator 14.

An elongated stem 70 is located for axial movement inside flow regulator 14. Stem 70 is formed with a hemispheroidal head 72 and a tapered neck 74. An annular valve element 76 formed of silicone rubber or like material is located between head 72 and neck 74. Valve element 76 is formed with a rounded edge so that a relatively smooth fluid flow surface is formed along head 72, valve element 76 and neck 74. Neck 74 is tapered so that as stem 70 moves axially inside housing 32 the cross-sectional flow area between neck 74 and the wall of tapered channel 36 changes. However, for any particular position of stem 70, this cross-sectional area remains constant along the length of neck 74. The reason for the constant cross-sectional flow area will be discussed below.

Stem 70 is formed with a shoulder 78 and a threaded end portion 80 located inside diaphragm housing 52. A diaphragm assembly 82 is retained on stem 70 by an axially threaded guide pin 84. Diaphragm assembly 82 includes a circular plate 86 which abuts shoulder 78, a backing member 88 and a bellows-type diaphragm 90 which is located between circular plate 86 and backing member 88. The peripheral edge of diaphragm 90 is retained between annular flange 50 and diaphragm housing 52. An O-ring seal 92 is located between backing member 88 and guide pin 84. Backing member 88 is formed with a central bore 94 in which coil spring 66 is located so that coil spring 66 tends to resist movement of backing member 88 towards plug member 58.

To assemble flow regulator 14, stem 70 is inserted into fluid inlet channel 34, diaphragm assembly 82 is positioned on stem 70 to abut shoulder 78 and guide pin 84 is screwed onto stem 70 to retain diaphragm assembly 82 in position. Diaphragm housing 52 is positioned against annular flange 50 so that the peripheral edge of diaphragm 90 is located between flange 50 and diaphragm housing 52. Screws 54 are then screwed into diaphragm housing 52 to retain the peripheral edge of diaphragm 90 in position. Coil spring 66 is then located in central bore 94 as plug member 58 is slid onto guide pin 84 and screwed into diaphragm housing 52.

In operation, fluid enters flow regulator 14 through fluid inlet channel 34. The fluid then flows past annular valve seat 38, through tapered flow channel 36, into exansion chamber 42 and then out through fluid output passage 48. Coil spring 66 is chosen with a suitable elastic modulus or spring constant, so that diaphragm assembly 82 moves toward plug member 58 until the fluid in expansion chamber 42 reaches a desired predetermined pressure. This movement causes stem 70 to move also, so that valve element 76 moves toward annular valve seat 38 to restrict the fluid flow into expansion chamber 42. If the fluid pressure in expansion chamber 42 rises above the predetermined pressure, the flow past annular valve seat 38 is further restricted so that the fluid pressure in expansion chamber 42 is reduced to the predetermined value. If the fluid pressure in expansion chamber 42 drops below the predetermined value, coil spring 66 causes the diaphragm assembly 82 to move away from plug member 58, which in turn causes valve element 76 to move away from annular valve seat 38 allowing more fluid flow into expansion chamber 42. In this manner the fluid in expansion chamber 42 is maintained at a constant predetermined pressure. This predetermined pressure may be adjusted by replacing coil spring 66 with another spring having a different spring constant. Alternatively, plug member 58 can be modified so that it can be positioned further into or out of diaphragm housing 52 to adjust the predetermined pressure if desired.

In a typical fluid dispensing system incorporating the dispensing apparatus of the present invention, the predetermined fluid pressure in expansion chamber 42 normally lies between 1 and 5 pounds per square inch. The pressure of the fluid entering fluid inlet channel 34 may vary from 30 to 70 pounds per square inch depending upon the characteristics of the particular fluid supply system which is connected to flow regulator 14. In addition, the pressure of fluid entering fluid inlet channel 34 may fluctuate due to changes in temperature or pressure in the fluid supply system. However, the pressure of the fluid in expansion chamber 42 remains constant and therefore the flow rate through fluid output passage 48 also remains constant. A constant flow rate through fluid outlet conduit 46 enables the dispenser 12 (FIG. 1) to dispense successive equal volumes of fluid as will be discussed below.

Reference is next made to FIG. 3 which is an exploded view of dispenser 12 with the cover removed. The major components of dispenser 12 are a size selector assembly 100, a counter mechanism 102, a switch assembly 104 and a valve assembly 106. The major components are mounted in dispenser 12 to a frame assembly which includes a base 108, an upright end plate 110 which is fastened to base 108 and a mounting bracket 112 which is also fastened to base 108.

Size selector assembly 100 includes a bank of selector push-button switches 114 and a timing circuit board 116. The bank of pushbuttons is conventionally arranged so that when one of the selector pushbuttons 114 is depressed, it remains depressed until another pushbutton 114 is depressed. Selector pushbuttons 114 are of the lighted or illuminated type, the purpose of which will be discussed below.

Circuit board 116 may include any conventional time-delay or timing circuit such that an electrical triggering or energizing input signal causes the circuit to produce an electrical output signal or voltage for a predetermined length of time. In the preferred embodiment, a resistance-capacitance type solid state timing circuit is used. Electrical power is supplied to the timing circuit through a conventional 110 volt power line 118 and a suitable step-down transformer 120.

The timing circuit in the preferred embodiment includes a plurality of variable resistances or potentiometers which are alternatively connected into the timing circuit by alternatively depressing the selector pushbutton switches 114. These potentiometers affect the resistance-capacitance time constant of the timing circuit and therefore control the duration of the time delay. The potentiometers are usually adjusted so that each produces a different time delay interval. Thus the selector pushbuttons 114 enable the timing circuit to produce an output voltage for different periods of time depending upon which selector pushbutton is depressed. For example, when the timing circuit is energized in a typical installation, depression of a first pushbutton 114 may produce an output voltage for 3 seconds, depression of a second selector pushbutton 114 may produce an output voltage for 10 seconds, and depression of a third selector pushbutton 114 may produce an output voltage for 20 seconds. Adjustment of the potentiometers enables these time intervals to be varied within predetermined ranges. The potentiometers are mounted on circuit board 116 so that they protrude through end plate 110 to facilitate easy adjustment when the cover is removed from dispenser 12.

It will be apparent to those skilled in the art that there are many different types of timing circuits which can be employed in the present invention. In addition, there are many ways of varying the time constant of the timing circuit and of providing alternative variable time constants, other than by substituting potentiometers as described above. Since any suitable timing circuit having the above characteristics may be employed in the present invention, the exact timing circuit used in the preferred embodiment will not be described in further detail.

Figure 5:
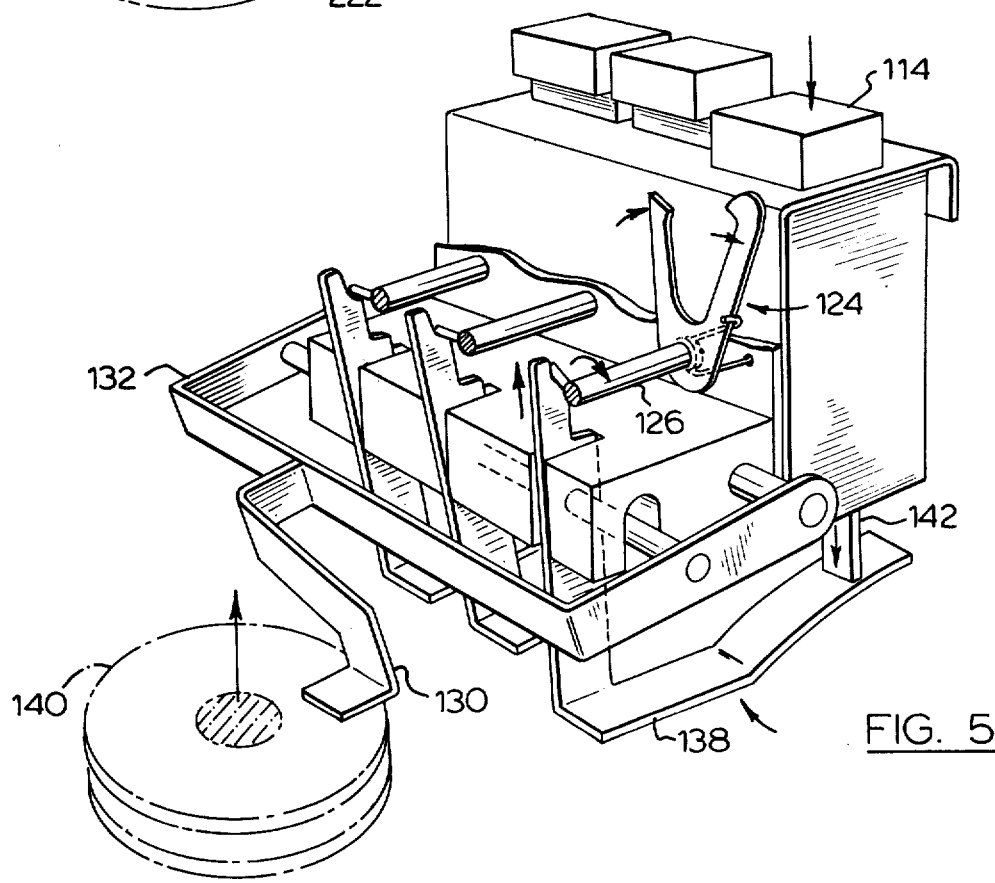
FIG. 5 is a perspective view of the size selector assembly and part of the counter assembly of the dispenser showing the counting mechanism during a count.

Reference is next made to FIGS. 3, 4 and 5 which show in detail the operation of counter-mechanism 102. In the preferred embodiment, counter-mechanism 102 is of the mechanical ratchet-wheel type in which the physical movement of an actuating element is required to register a count. Counter-mechanism 102 has three counters 122, one of which corresponds with each size selector pushbutton 114. Counters 122 each have four digit wheels but this number may be increased or decreased as desired. As seen from FIG. 4, each counter 122 has a ratchet mechanism 124 which is activated by movement of a pivot shaft 126 to rotate the counter wheels. The ratchet mechanism 124 and the counter wheels are conventional and are not considered to be part of the present invention so they will not be described in further detail. For the purpose of the present discussion it will be sufficient to note that when pivot shaft 126 is pivoted in a clockwise direction and returned, counter 122 will register a count.

Movement of piovt shaft 126 is caused by a linkage assembly 128 which includes a counter actuating arm 130 which is attached to a pivot bracket 132. Pivot bracket 132 pivots about a shaft 134. Pivot bracket 132 has a mounting rod 136 fastened thereto. Sensing fingers 138 are pivotally mounted on rod 136 so that one finger 138 corresponds with each counter 122. A spool 140, which is part of valve assembly 106, causes arm 130 to move up and down as will be discussed below.

Counter mechanism 102 is mounted adjacent to the bank of size selector pushbuttons 114. Each selector pushbutton 114 has a lower projection 142. When a particular size selector pushbutton 114 is depressed, the respective projection 142 is extended toward sensing finger 138. As discussed above, selector pushbuttons 114 are chosen so that only one of the buttons may be depressed at any one time and therefore only one projection 142 is in the extended position at any one time.

The operation of counter mechanism 102 may be seen from FIG. 5. One of the selector pushbuttons 114 has been depressed causing projection 142 to extend below the bank of pushbuttons 114. Spool 140 moves upwardly when dispenser 12 begins to dispense fluid thereby causing arm 130 to move upwardly, pivot bracket 132 to pivot about shaft 134, and sensing fingers 138 to move upwardly also. As sensing fingers 138 move upwardly, one of the fingers will engage the projection 142 corresponding to the depressed size selector pushbutton 114. This engagement causes sensing finger 138 to pivot in a clockwise direction so that the upper end of sensing finger 138 engages pivot shaft 126. Pivot shaft 126 is thereby pivoted in a clockwise direction to activate ratchet mechanism 124. When dispenser 12 stops dispensing fluid, spool 140 moves downwardly. Sensing finger 138 disengages pivot shaft 126 so that pivot shaft 126 moves counter-clockwise allowing ratchet mechanism 124 to complete a count. It will be appreciated that only one of the sensing fingers 138 engages a projection 142 and therefore when a particular size selector pushbutton 114 is depressed, only the corresponding counter 122 registers a count when spool 140 moves up and down.

Although a mechanical ratchet-wheel type counter has been described in the preferred embodiment any other type of counter could be adapted for use in dispenser 12 as will be apparent to those skilled in the art. For example, an electrical impulse counter could be used which would be activated by the timer circuit. Selector pushbuttons 114 could be used with an electric counter mechanism to select a counter corresponding to each selector pushbutton.

Figure 6:
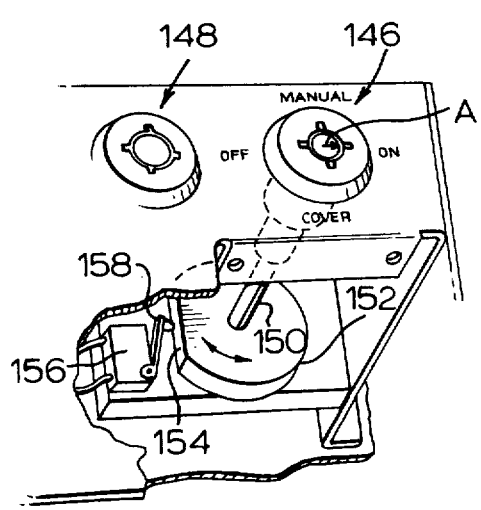
FIG. 6 is a perspective view of the switch assembly of the dispenser showing the master switch in the "on" position.
Figure 7:
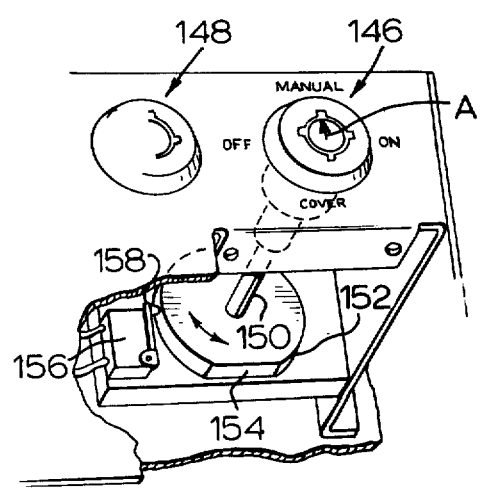
FIG. 7 is also a perspective view of the switch assembly of the dispenser showing the master switch in the "manual" position.

Reference is next made to FIGS. 3, 6 and 7 which illustrate the structure and operation of the switch portion 104 of dispenser 12. Switch portion 104 includes a master switch 146 and an operator's switch 148 both of which are key operated. Master switch 146 includes a central shaft 150 upon which is mounted a cam 152, so that when a master key (not shown) is inserted into master switch 146 and turned, cam 152 rotates. Cam 152 is formed with a flat section 154. A switch 156 is mounted adjacent to cam 152. Switch 156 is actuated by a cam follower 158 which is biased to remain in sliding contact with cam 152.

Master switch 146 may be positioned alternatively in one of four positions: "off", "manual", "on" and "cover". The position of master switch 146 is indicated by arrow A. Switch 156 is closed only when master switch 146 is in the on position as shown in FIG. 6. When switch 156 is closed, electrical power is supplied to the timing circuit of dispenser 12. The function of the other positions of master switch 146 will be discussed below.

Operator's switch 148 is a simple on-off single pole key operated switch. Operator's switch 148 is connected to the timing circuit so that the timing circuit can be energized only when operator's switch 148 is in on position. The operation of operator's switch 148 will be further described below.

Switch portion 104 includes a stop pushbutton switch 160 which is of the type that remains depressed once it has been depressed. Further depression then releases the pushbutton. Pushbutton 160 is also of the illuminated or lighted type. When stop pushbutton 160 is depressed, fluid does not flow through dispenser 12 as discussed below.

Figure 8:
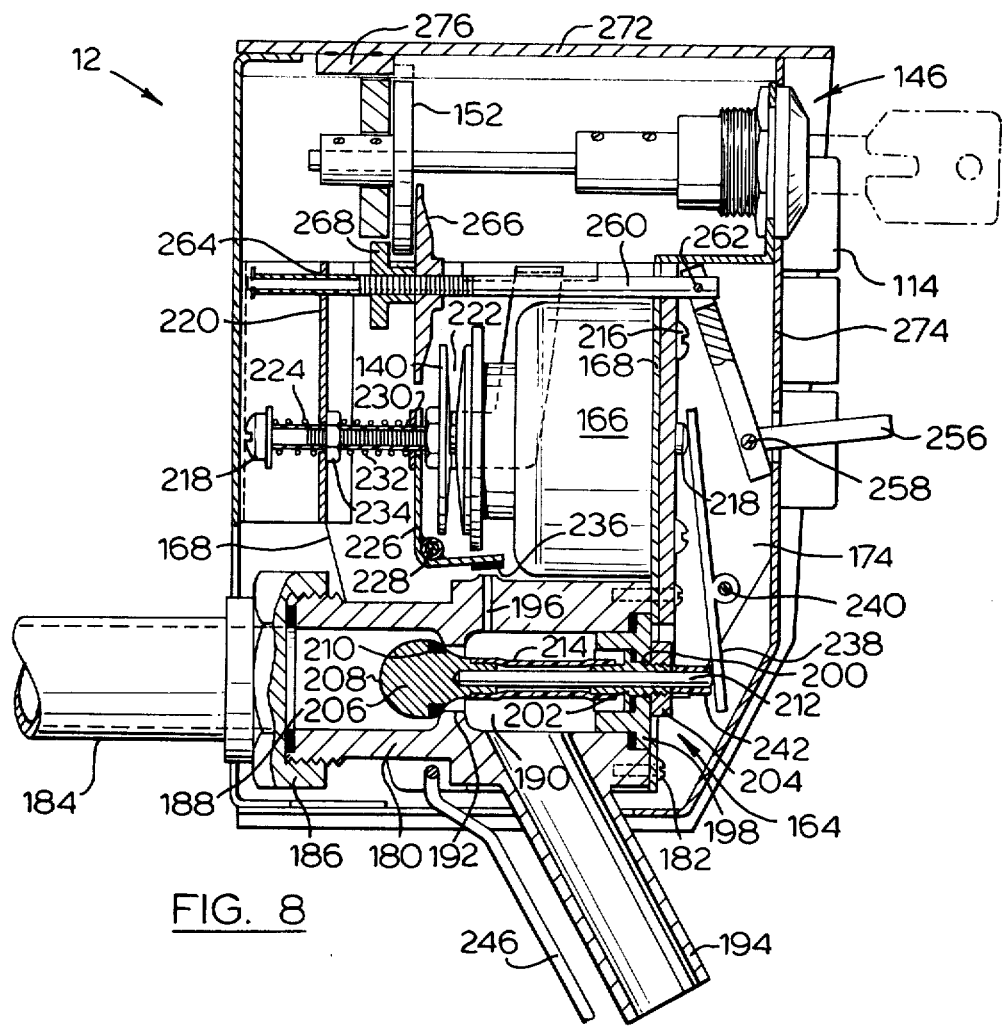
FIG. 8 is a cross-sectional view of the dispenser.

Reference is next made to FIGS. 3 and 8 which illustrate the valve assembly 106. Valve assembly 106 includes a support bracket 168 on which are mounted a valve 164 (FIG. 8) and a solenoid actuator 166. Support bracket 168 is formed with a pair of mounting flanges 170 which slidably engage a pair of retainer brackets 172 mounted on dispenser base 108. A channel member 174 having a pair of locating pins 176 is mounted on support bracket 168. Locating pins 176 fit into locating holes 178 formed in mounting bracket 112 when valve assembly 106 is assembled in dispenser 12. It will be appreciated that valve assembly 106 is removably assembled in dispenser 12 by sliding valve assembly 106 into dispenser 12 so that mounting flanges 170 slide under respective retainer brackets 172, and locating pins 176 enter respective locating holes 178.

Valve 164 includes a valve enclosure 180 (FIG. 8) which is fastened to support bracket 168 by screws 182. Valve enclosure 180 is coupled to a fluid inlet conduit 184 by a standard pipe coupling 186. Inlet conduit 184 is coupled to fluid outlet conduit 46 (FIG. 1) in fluid supply system 16. Valve enclosure 180 is formed with a fluid inlet chamber 188 and a fluid output chamber 190. A circular valve seat 192 separates respective fluid inlet and output chambers 188, 190. Valve enclosure 180 also includes a nozzle 194 and a vent 196 which communicate with fluid output chamber 190. A plug 198 having a central opening 200 is located in the end of valve enclosure 180. A bushing 202 is located in central opening 200 and is retained therein by a nut 204.

A valve plunger assembly 206 is located in valve enclosure 180. Valve plunger assembly 206 includes a generally hemispheroidal head 208 and a circular seal 210 which engages valve seat 192. Seal 210 is preferably formed of silicone rubber, but it may be formed of any suitable material. A stem 212 is attached to head 208 and is slidably located in bushing 202. Bushing 202 also forms part of plunger assembly 206. A tubular stretch-seal 214 of silicone rubber or like material, is bonded at opposite ends respectively to head 208 and bushing 202. It will be appreciated that as valve plunger 206 reciprocates longitudinally inside valve enclosure 180 valve 164 opens and closes to permit fluid to flow from fluid inlet conduit 184 out through nozzle 194.

It should be noted that stretch-seal 214 biases valve 164 in a closed position, however, the pressure of fluid entering fluid inlet chamber 188 also helps close valve 164. Stretch-seal 214 prevent fluid from coming into contact with the sliding surfaces between stem 212 and bushing 202. This prevents valve 164 from becoming clogged or jammed due to a build up of deposits from the dispensed fluid. Finally, the surfaces inside valve enclosure 180 are smooth and have been rounded to avoid any sharp edges or restrictions to influence fluid flow through valve 164.

Solenoid actuator 166 is mounted on support bracket 168 adjacent to valve enclosure 180 by screws 216. Actuator 166 has a plunger 218 which projects through an opening in channel member 174. Plunger 218 also extends behind actuator 166 through an opening in a cross member 220 which is attached to support bracket 168. A spool is mounted on plunger 218. Spool 140 defines a V-shaped circular groove in which counter actuating arm 130 (FIG. 4) is located when valve assembly 106 is assembled in dispenser 12. Actuator 166 is biased in a retracted position (FIG. 8) by a spring 224. When actuator 166 is electrically energized plunger 218 moves to the right, (as seen in FIG. 8) to an extended position.

A vent cover 226 (FIG. 8) is pivotally mounted on a shaft 228 fastened to support bracket 168. Vent cover 226 has a forked end 230 which engages plunger 218. Forked end 230 is coupled to plunger 218 through a spring 232 and a nut 234. When plunger 218 moves to the right (FIG. 8) vent cover 226 tends to rotate in a clockwise direction about shaft 228. Vent cover 226 is formed with a pad 236 of silicone rubber or like material, which covers vent 196 when vent cover 226 rotates clockwise. The purpose of vent cover 226 will be described below.

A rocker arm 238 is pivotally mounted on a pivot shaft 240 located in channel member 174. When solenoid actuator 166 is electrically energized, plunger 218 causes rocker arm 238 to rotate in a clockwise direction causing valve stem 212 to move to the left (FIG. 8) thereby opening valve 164. When solenoid actuator 166 is de-energized, spring 224 retracts solenoid plunger 218 and stretch-seal 214 causes valve plunger 206 to close valve 164. When solenoid actuator 166 is energized to open valve 164, vent cover 226 covers vent 196 so that fluid only flows from fluid inlet conduit 184 out through nozzle 194. When solenoid actuator 166 is de-energized thereby closing valve 164, vent 196 is uncovered allowing air to enter fluid output chamber 190 to provide a rapid evacuation of fluid from chamber 190 and nozzle 194.

A sleeve 242 of silicone rubber or other elastic material is slidably mounted on valve stem 212 adjacent to rocker arm 238. When rocker arm 238 depresses valve plunger 206, sleeve 242 is compressed to cushion the pressure exerted on stem 212 by rocker arm 238. The cushioning effect provided by sleeve 242 affects the rate of opening of valve 164 so that carbonated beverages are less likely to be dispensed through nozzle 194 with excessive foam or loss of carbonation.

Valve assembly 106 includes a trigger 246 which is located parallel and adjacent to nozzle 194. Trigger 246 is attached to a pivoting cross member 248 mounted on support bracket 168. Cross member 248 engages a normally open switch 250 so that when trigger 246 is moved toward nozzle 194 switch 250 is closed. A spring 252 engages cross member 248 to hold trigger 246 parallel to nozzle 194. When switch 250 is closed, the dispenser timing circuit is energized or activated to energize solenoid actuator 166 thereby opening valve 164. Trigger 246 is normally moved by placing a glass or other fluid receptacle under nozzle 194. In this manner fluid is automatically dispensed merely by placing a receptacle in position under nozzle 194. Further, having the receptacle in position before fluid is dispensed eliminates the wasting of fluid which may result if the dispenser is triggered in another manner.

Valve assembly 106 also includes a manual linkage for manually operating valve 164. A manual lever 256 is pivotally mounted on a rocker shaft 258 located in channel member 174. Lever 256 is pivotally coupled to a locking rod 260 by a pivot pin 262. Locking rod 260 passes through a guide opening 264 in cross member 220 so that when manual lever 256 is pivoted, locking rod 260 tends to move longitudinally. A bevelled disc 266 and a blocking member 268 are threadably locked together onto locking rod 260. When master switch 146 is in any position except the "cover" position, cam 152 is located between bevelled disc 266 and blocking member 268. Cam 152 thereby prevents longitudinal movement of locking rod 260. When master switch 146 is in the "manual" position as shown in FIG. 7, flat section 154 of cam 152 is adjacent to locking rod 260. Blocking member 268 can then be moved to the right (FIG. 8) as locking rod 260 moves to the right and manual lever 256 pivots in a clockwise direction. As locking rod 260 moves to the right, bevelled disc 266 engages spool 140 thereby causing solenoid plunger 218 to move to the right to open valve 164 as described above.

As can be seen from FIGS. 1 and 8, dispenser 12 has a cover 272 which encloses the working parts of dispenser 12. Cover 272 has a front face 274 which is formed with openings through which switches 146, 148, manual lever 256, and pushbuttons 114, 160 project. Front face 274 also has openings through which counters 122 may be viewed. Unless cover 272 is removed from dispenser 12, it is not possible to adjust the counters or the operation of the timing circuit. Cover 272 is formed with a block 276 which engages cam 152 when master switch 146 is in any other position except the cover position. Cover 272 cannot then be removed from dispenser 12. When master switch 146 is in the cover position, the flat section 154 of cam 152 is adjacent to block 276. Block 276 can then be moved past cam 152 to permit cover 272 to be removed from dispenser 12.

To install the fluid dispensing apparatus of the present invention in a fluid supply system, flow regulator 14 is installed close to the point where the fluid is to be dispensed. Flow regulator 14 is then connected to a fluid supply line 22 (FIG. 1) and a fluid inlet conduit 184 which leads to the point where the fluid is to be dispensed. Valve assembly 106 (FIG. 3) is then coupled to fluid inlet conduit 184. With cover 272 removed, the remaining or control portion of dispenser 12 is then assembled to valve assembly 106. Cover 272 is then assembled to dispenser 12 and locked in position by master switch 146. It will be appreciated that dispenser 12 may be easily disassembled for cleaning or for maintenance purposes simply by removing cover 272 and lifting the control portion of dispenser 12 off valve assembly 106. Valve assembly 106 can then be easily replaced if maintenance or cleaning is required, so that the "down-time" or inoperative time of dispenser 12 is minimized. Similarly, if valve assembly 106 is operative, the control portion of dispenser 12 may be easily replaced with a substitute control portion if maintenance of the control portion is required.

The operation of the dispensing apparatus of the present invention will be considered by referring firstly to flow regulator 14. As discussed above, the average pressure of fluid entering flow regulator 14 from fluid supply line 22 typically varies from 30 to 70 pounds per square inch. In addition, this pressure fluctuates due to changes in temperature and the inherent characteristics such as the quantity of fluid in the fluid supply system 16 in any particular installation. Flow regulator 14 reduces the pressure of the fluid supply to a relatively constant pressure between 1 to 5 pounds per square inch. The flow losses in fluid conduits 46, 184 between flow regulator 14 and dispenser 12 are relatively insignificant due to the relatively short length of these conduits and the low fluid pressure therein. For this reason, the total pressure of the fluid entering dispenser 12 remains generally constant during the transition from static to dynamic flow as valve 164 is opened. Finally, as discussed above, the configuration of the internal components of flow regulator 14 reduces the likelihood of the production of foam or of the reduction of carbonation if carbonated beverages are to be dispensed through dispenser 12.

Fluid enters dispenser 12 through fluid inlet conduit 184 at a relatively low pressure. Consequently, when valve 164 opens or is "cracked" the initial pressure drop as fluid enters fluid output chamber 190 will be relatively small. This is important when carbonated beverages such as beer are dispensed because a high initial pressure drop will result in excessive foam being produced in the dispensed fluid. The relatively low pressure of the fluid entering dispenser 12 also enables the internal dimensions of valve 164 to be made comparatively large for any desired rate of output flow. The larger dimensions also reduce the likelihood of excessive foam as well as facilitate the cleaning of valve 164.

To operate fluid dispenser 12 to automatically dispense fluid in predetermined quantities, a key is inserted into master switch 146 and the switch is turned to the on position. This causes switch 156 to close and selector pushbuttons 114 to be illuminated to a low intensity to indicate that electrical power is being supplied to the timing circuit of dispenser 12. A key is then inserted into operator's switch 148 and this switch is turned to the on position. This causes the stop pushbutton 160 to be illuminated to a low intensity to indicate that dispenser 12 is operable and is ready to automatically dispense fluid. When operator's switch 148 is in the off position, the timing circuit cannot be energized and therefore fluid cannot be automatically dispensed through dispenser 12.

In a typical installation dispenser 12 would be operated by a bartender who alone would have possession and control of the key to operator's switch 148. The manager or owner of the premises in which dispenser 12 is used would have sole possession and control of the key to master switch 146. The key to master switch 146 is a master key which also fits operator's switch 148, so that the manager can operate operator's switch 148. However, the key to the operator's switch 148 will not operate master switch 146, so that the bartender cannot use dispenser 12 or gain access to the interior of dispenser 12 without the consent of the owner or manager.

When switches 146, 148 are both turned to the on position so that dispenser 12 is operable automatically, one of the size selector pushbuttons 114 is then depressed. A container is then positioned under nozzle 194 so that it contacts trigger 246. Movement of trigger 246 closes switch 250 which in turn energizes the timing circuit. Energization of the timing circuit produces an output voltage for a predetermined interval which energizes solenoid actuator 166. Energization of solenoid 166 causes valve 164 to open and counter actuating arm 130 to move to register a count on the counter 122 corresponding to the depressed size selector pushbutton 114. When valve 164 is open and fluid is being dispensed or poured, the size selector pushbuttons 114 are illuminated to a relatively high intensity to visually indicate that fluid is being dispensed. When the predetermined interval is completed the timing circuit ceases to produce an output voltage, solenoid 166 is de-energized thereby closing valve 164 and the pushbuttons 114 return to low intensity illumination to indicate that dispenser 12 has completed dispensing the predetermined quantity of fluid.

Size selector pushbuttons 114 each connect a respective potentiometer into the timing circuit as discussed above. Adjustment of the potentiometers varies the predetermined interval during which valve 164 is open and therefore the quantity of fluid dispensed each time the timing circuit is energized. In a typical installation, the respective potentiometers would be adjusted so that when a first selector pushbutton 114 is depressed, dispenser 12 pours a small size container of fluid, when a second selector pushbutton is depressed dispenser 12 pours a larger size container of fluid, and when a third selector pushbutton 114 is depressed dispenser 12 pours a still larger size container of fluid. In each case the counter 122 associated with a particular size selector pushbutton 114 would record the number of containers of fluid poured of that predetermined size. In the preferred embodiment three size selector pushbuttons 114 are shown and therefore dispenser 12 will pour three predetermined sizes or quantities of fluid. However, if desired the number of pushbuttons 114 could be increased or decreased so that dispenser 12 could pour more or fewer different predetermined quantities of fluid.

It will be appreciated however, that adjustment of the potentiometers enables dispenser 12 to automatically dispense virtually any practical quantity of fluid. In other words, any size container can be automatically filled to a predetermined level by adjustment of one of the potentiometers. The number pushbutton selector switches merely governs the number of different quantities which can be dispensed at any one time without further adjustment of the potentiometers.

When a size selector pushbutton 114 is depressed and dispenser 12 is dispensing fluid, it may be desirable to stop the fluid flow before the timing circuit is de-energized. This can be accomplished by depressing stop pushbutton 160. When stop pushbutton 160 is depressed, solenoid actuator 166 is de-energized thereby closing valve 164. When depressed, stop pushbutton 160 is illuminated to a relatively high intensity to indicate that operation of dispenser 12 has been suspended. Trigger 246 cannot energize the timing circuit to initiate fluid flow as long as stop pushbutton 160 is depressed.

To operate dispenser 12 manually, master switch 146 is turned to the manual position. This permits the manual linkage to be operated to open valve 164 as discussed above. This also causes switch 156 to open so that electrical power is no longer supplied to the timing circuit and therefore dispenser 12 can no longer be operated automatically. Fluid will be dispensed through nozzle 194 as long as manual lever 256 is depressed. In this situation the counters 122 will no longer accurately reflect the quantity of fluid being dispensed through dispenser 12. Since dispenser 12 can only be put into the manual mode of operation by using the master or manager's key, a bartender cannot operate dispenser 12 manually without the manager's consent. This prevents a bartender from dispensing more fluid through dispenser 12 than is indicated by counters 122 without the manager's approval.

The potentiometers which permit adjustment of the predetermined quantities of fluid being dispensed through dispenser 12 are not accessible when cover 272 is in position. To adjust these potentiometers, master switch 146 must be turned to the cover position and cover 272 must be removed. Since only the manager controls master switch 146, a bartender cannot normally gain access to the potentiometers and therefore he cannot vary the quantity of fluid being dispensed corresponding to each count of counters 122.

From the above description it will be apparent that the present invention provides an automatic fluid dispensing apparatus which dispenses varying predetermined quantities of fluid. In one of its aspects the present invention provides a dispenser to which fluid is supplied under pressure. The dispenser has a solenoid actuated valve which minimizes the creation of foam when carbonated beverages are dispensed, and which provides a rapid fluid cleanout when the valve is closed. The dispenser has a timing circuit which may be energized to open the valve for a predetermined interval so that the dispenser pours a predetermined quantity of fluid. A plurality of size selector pushbuttons are connected to the timing circuit so that the predetermined interval during which the valve is open may be preselected. The predetermined interval corresponding to each size selector pushbutton may be adjusted. Counters record the number of times the dispenser pours each preselected quantity of fluid. In addition, a master switch and an operator's switch are provided so that the operator of the dispenser cannot adjust or alter the predetermined quantities dispensed or the record count of the total fluid dispensed.

In another of its aspects the present invention provides a flow regulator which may be coupled between a source of fluid under pressure and a fluid dispenser. The regulator compensates for variations or fluctuations in fluid supply pressure and supplies fluid at a relatively constant low pressure to the fluid dispenser. The regulator is dimensioned internally to minimize the production of excessive foam or decarbonation when carbonated beverages flow through the regulator.

In yet another of its aspects the present invention provides an automatic fluid dispensing apparatus which may be used to dispense a preselected quantity of fluid. The dispensing apparatus includes a flow regulator as described above which delivers a relatively constant low pressure supply of fluid to a fluid dispenser. The dispensing apparatus also includes a dispenser as described above which automatically dispenses a predetermined quantity of fluid. The predetermined quantity may be preselected from a plurality of variable predetermined sizes.

What I claim is:

1. Fluid dispensing apparatus for measuring and dispensing fluid from a pressurized fluid supply comprising:
   a. a valve assembly including a valve and a solenoid actuator coupled thereto for opening the valve, the valve being adapted to be coupled to the pressurized fluid supply;
   b. a timing circuit adapted to be connected between a source of electrical power and the solenoid actuator, the timing circuit including means for energizing the solenoid actuator to open the valve for a plurality of different predetermined intervals;
   c. selector means operatively connected to the timing circuit, the selector means including a plurality of selector switches, each selector switch being adapted to select a different predetermined interval;
   d. a trigger coupled to the timing circuit to activate the timing circuit and energize the solenoid actuator;
   e. a removable cover enclosing the valve assembly and the timing circuit, the cover including locking means for locking the cover in position and preventing removal of the cover and thus access to the valve assembly and timing circuit; and
   f. manual linkage means operatively coupled to the valve assembly for manually opening the valve; said manual linkage means including blocking means located inside the cover for preventing manual operation of the valve while the cover is in said locked position.

2. Fluid dispensing apparatus as claimed in claim 1 wherein the valve assembly is demountable from the remainder of the dispensing apparatus, so that the remainder of said apparatus may be replaced without uncoupling the valve assembly from the pressurized fluid supply.

3. Fluid dispensing apparatus as claimed in claim 2 and further comprising adjustment means connected to the timing circuit for varying the preselected predetermined intervals, said adjustment means being located inside the removable cover to prevent access thereto without removing the cover.

4. Fluid dispensing apparatus as claimed in claim 3 and further comprising counting means operatively coupled to the selector means and operable upon opening the valve for recording the quantity of fluid dispensed by the dispensing apparatus, the counting means being located inside the cover to prevent access thereto without removing the cover.

5. Fluid dispensing apparatus as claimed in claim 4 wherein said locking means includes a master switch coupled to the timing circuit and said blocking means to control the operation of the dispensing apparatus and the removal of the cover, and further comprising an operator's switch connected to the timing circuit for controlling the timing circuit energizing means.

6. Fluid dispensing apparatus as claimed in claim 5 wherein the valve includes a plunger assembly movable from an open to a closed position to respectively open and close the valve, the plunger assembly including a head, an elongated stem attached thereto, a bushing slidably mounted on the stem remote from the head, a tubular elastic seal slidably located on the stem and attached at opposed ends to the head and the bushing, and the bushing being mounted in the valve so that the seal biases the plunger assembly toward said closed position.

7. Fluid dispensing apparatus as claimed in claim 6 and further comprising an elastic sleeve slidably located on the stem between the bushing and the solenoid actuator for controlling the rate of opening of the valve.

8. Fluid dispensing apparatus as claimed in claim 7 wherein the valve defines a vent located in the upper portion of the valve, and wherein the valve assembly further comprises vent cover means operatively coupled to the solenoid actuator for closing the vent when the valve is opened and for opening the vent when the valve is closed to permit fluid to rapidly evacuate from the valve.

9. Fluid dispensing apparatus as claimed in claim 8 and further comprising a flow regulator adapted to be connected between the pressurized fluid supply and the valve, the flow regulator having a housing defining a tapered flow channel; a stem located in said tapered flow channel and being movable axially in said channel for controlling flow of fluid therethrough, the stem having a neck tapered so that the cross-sectional flow area between said neck and said tapered flow channel wall is constant along the length of the neck; and a diaphragm assembly connected to the stem and responsive to fluid pressure in the flow regulator, so that fluid is discharged from the flow regulator at a generally constant pressure below the pressure of the fluid supply.

10. Fluid dispensing apparatus for measuring and dispensing fluid from a pressurized fluid supply comprising:
   a. a valve assembly including a valve and a solenoid actuator coupled thereto for opening the valve, the valve being adapted to be coupled to the pressurized fluid supply;
   b. the valve including an enclosure defining a fluid inlet chamber for communication with the fluid supply and a fluid output chamber, the valve further including a plunger assembly movable from an open to a closed position to respectively open and close the valve thereby permitting and preventing fluid flow from the inlet chamber to the output chamber;
   c. a timing circuit adapted to be connected between a source of electrical power and the solenoid actuator, the timing circuit including means for energizing the solenoid actuator to open the valve for a plurality of different predetermined intervals;
   d. selector means operatively connected to the timing circuit, the selector means including a plurality of selector switches, each selector switch being adapted to select a different predetermined interval;
   e. a trigger coupled to the timing circuit to activate the timing circuit and energize the solenoid actuator; and
   f. the valve plunger assembly including a head, an elongated stem attached thereto, a bushing slidably mounted on the stem remote from the head, a tubular elastic seal slidably located on the stem and attached at opposed ends to the head and the bushing, and the bushing being mounted in the valve enclosure so that the seal biases the plunger assembly toward said closed position.

11. Fluid dispensing apparatus as claimed in claim 10 wherein the valve assembly is demountable from the dispensing apparatus.

12. Fluid dispensing apparatus as claimed in claim 11 wherein the valve includes an elastic sleeve slidably located on the stem between the bushing and the solenoid actuator for controlling the rate of opening of the valve.

13. Fluid dispensing apparatus as claimed in claim 12 and further comprising counting means operatively coupled to the selector means and operable upon opening the valve for recording the quantity of fluid dispensed by the dispensing apparatus.

14. Fluid dispensing apparatus as claimed in claim 13 and further comprising: a removable cover enclosing the valve assembly, the timing circuit and the counting means; the cover including locking means for locking the cover in position and preventing removal of the cover and thus access to the valve assembly, the timing circuit and the counting means.

15. Fluid dispensing apparatus as claimed in claim 14 and further comprising a flow regulator adapted to be connected between the pressurized fluid supply and the valve, the flow regulator having a housing defining a tapered flow channel; and a stem located in said tapered flow channel and being movable axially in said channel for controlling flow of fluid therethrough, the stem having a neck tapered so that the cross-sectional flow area between said neck and said tapered flow channel wall is constant along the length of the neck; and a diaphragm assembly connected to the stem and responsive to fluid pressure in the flow regulator, so that fluid is discharged from the flow regulator at a generally constant pressure below the pressure of the fluid supply.

16. In fluid dispensing apparatus for measuring and dispensing fluid from a pressurized fluid supply, the dispensing apparatus having the following elements:
   a. a valve assembly including a valve and a solenoid actuator coupled thereto for opening the valve, the valve being adapted to be coupled to the pressurized fluid supply;
   b. a timing circuit adapted to be connected between a source of electrical power and the solenoid actuator, the timing circuit including means for energizing the solenoid actuator to open the valve for a plurality of different predetermined intervals;
   c. selector means operatively connected to the timing circuit, the selector means including a plurality of selector switches, each selector switch being adapted to select a different predetermined interval; and
   d. a trigger coupled to the timing circuit to activate the timing circuit and energize the solenoid actuator;

means for improving the operation of the dispensing apparatus, the improvement comprising:
   a flow regulator adapted to be connected between the pressurized fluid supply and the valve, the flow regulator having a housing defining a tapered flow channel; a stem located in said tapered flow channel and being movable axially in said channel for controlling flow of fluid therethrough, the stem having a neck tapered so that the cross-sectional flow area between said neck and said tapered flow channel wall is constant along the length of the neck; and a diaphragm assembly connected to the stem and responsive to fluid pressure in the flow regulator, so that fluid is discharged from the flow regulator at a generally constant pressure below the pressure of the fluid supply.

* * * * *